United States Patent Office
3,261,213
Patented July 19, 1966

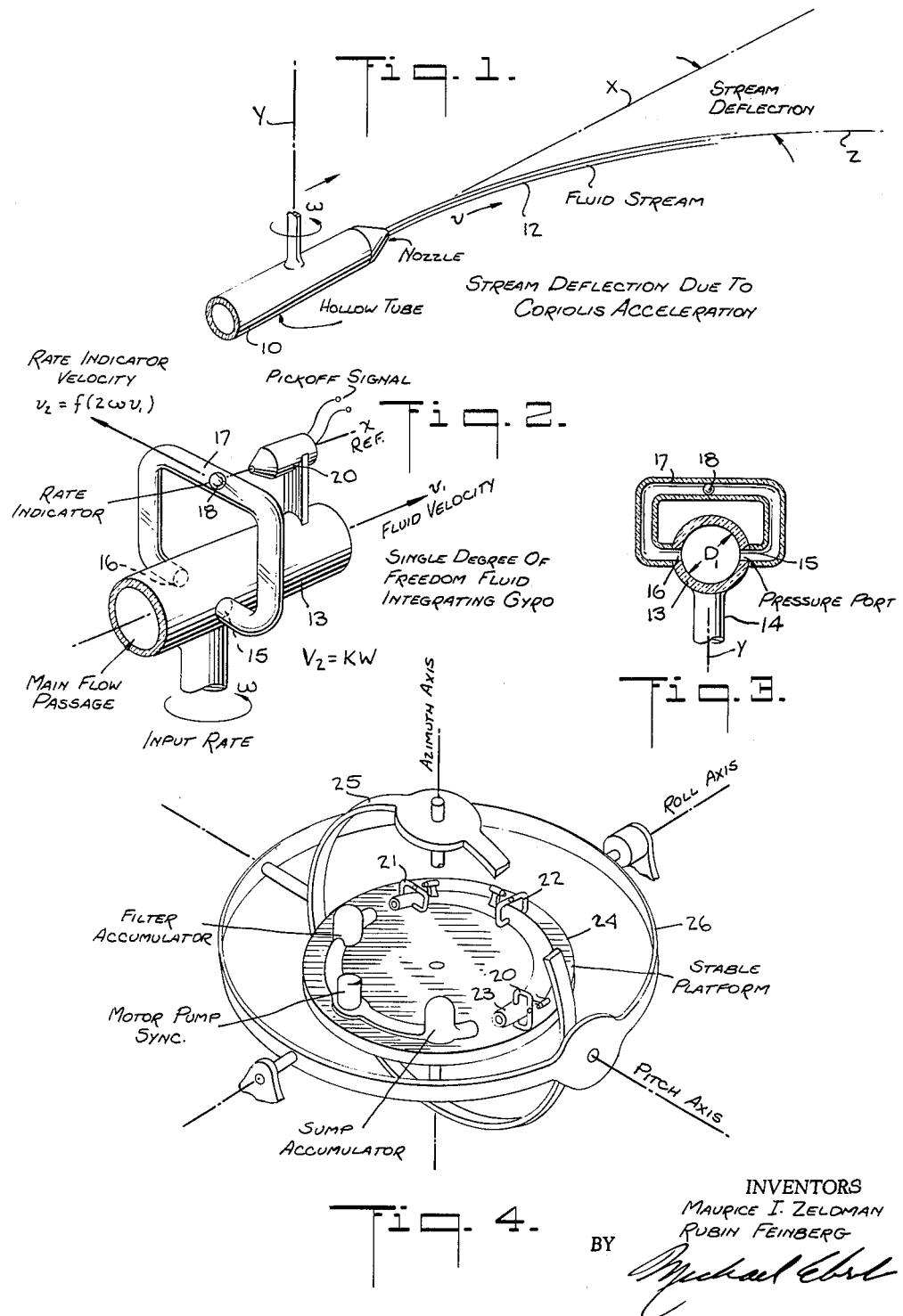

3,261,213
FLUID RATE-INTEGRATING GYRO
Maurice I. Zeldman, West Hempstead, and Rubin Feinberg, Hicksville, N.Y., assignors to Bulova Watch Company, Inc., New York, N.Y., a corporation of New York
Filed Nov. 14, 1962, Ser. No. 237,664
9 Claims. (Cl. 74—5.6)

This invention relates generally to gyroscopic devices, and more particularly to a single-degree-of-freedom, rate-integrating gyro of high accuracy.

In inertial navigation system, measurements made by accelerometers must be carried out with respect to a stable system of references. These references, which are defined in terms of angular relationships, are ordinarily provided by gyroscopic devices. Free gyroscopes of conventional design are constituted by a balanced rotor which spins at high speed about an axis passing through the center of gravity, the gyroscope being so mounted that it can turn or tilt in any direction about this center.

Vertical and horizontal gyros are commonly called displacement gyros, for they sense the angular displacement or rotation of a base surface about a reference line. In guidance systems, control signals are supplied by such displacement gyros, these signals being proportional to the deviation of the guided vehicle or missile.

For accurate control and smooth recovery, one must also supply a signal proportional to the rate of deviation, and such signals are provided by rate gyros which have a restricted gimbal free to rotate about one axis only. Rate gyros otherwise conform to the same basic principles as free gyros. In practice, the spin axis of a yaw rate gyro is mounted in parallel relation to the line of flight, while the spin axis of a roll rate gyro is mounted parallel to the pitch axis of the guided vehicle, and a pitch rate gyro has its spin axis parallel to the yaw axis, also at right angles to the line of flight.

Conventional gyros making use of spinning masses are subject to various operational errors due, for example, to dynamic unbalance of the mass, constraint uncertainties, friction effects, and numerous other difficulties, including anisoelastic effects. Ideally, a gyro is exactly balanced about its inner and outer axes, whereby the center of gravity intersects the inner axis, and no torque results. But in practice this is not the case, and spurious torques are developed. Ideally, also, the gyro structure has spring constants which are equal in all directions (isoelastic), but under actual conditions this is not the case and errors exist. Moreover, since the rotor is generally operated from a voltage supply, unless this supply is carefully regulated, further errors are produced.

Accordingly, it is the primary object of this invention to provide a single-degree-of-freedom (S-D-F) rate-integrating gyro which is of high accuracy and which overcomes or minimizes the drawbacks characteristic of conventional spinning mass gyros.

More specifically, it is an object of the invention to provide a rate gyro operating on fluid dynamic principles without a spinning rotor, the gyro being of inexpensive design and being useable in a servo mode (constantly driven to null) to stabilize one axis of an inertial platform, or in an angular mode to measure spatial movement from a reference datum.

Also an object of the invention is to provide a fluid rate gyro which responds accurately to relatively low input rates in the order of, for example, .01 degree per hour.

Briefly stated, these objects are accomplished in a single-degree-of-freedom fluid integrating gyro wherein a fluid under constant pressure is fed through a tube which is subject to rotational displacement about an axis which is normal to and intersects the longitudinal axis of the tube, which displacement of the tube represents the input rate. The resultant fluid pressure differential developed in said tube on opposing sides of said longitudinal axis by reason of Coriolis acceleration, gives rise to a proportional fluid flow in a loop communicating with said tube on the opposing sides thereof, which flow is detected optically, electromagnetically or electrostatically to produce a displacement indication. Three such fluid gyros placed with their sensitive axes in quadrature may be operated from a common flow tube. This arrangement may be used to detect the roll, pitch, and yaw of a moving body.

For a better understanding of the invention, as well as other objects and further features thereof, reference is made to the following detailed description to be read in conjunction with the accompanying drawing, wherein:

FIG. 1 is a sketch illustrating the deflection of a fluid stream due to Coriolis acceleration;

FIG. 2 is a perspective view of a S-D-F fluid integrating gyro in accordance with the invention;

FIG. 3 is a transverse section taken through said gyro; and

FIG. 4 is a perspective view of a practical embodiment of three orthogonally arranged gimbal-mounted gyros in accordance with the invention.

Before considering the actual structure of the fluid S-D-F gyro, inasmuch as it operates on fluid dynamic principles, and is based on the Coriolis component of acceleration, we shall first refer to FIG. 1, which illustrates the principles underlying the invention. FIG. 1 shows a fluid supplied through a hollow tube 10 terminating in a nozzle 11 and resulting in the ejection of a fluid stream 12.

Coriolis acceleration is that due to a rotating frame of reference. The operation of the gyro in accordance with the invention depends on the Coriolis component of acceleration generated by the cross product of $$2\ \vec{\omega} \times \vec{v} = A_c$$

We shall assume that the fluid stream 12 flows at a constant velocity $\vec{v}$.

With the tube 10 held stationary, fluid 12 will be emitted in a straight line X, in alignment with the longitudinal axis of the tube, assuming the absence of gravitational attraction. If the tube is now rotated about an axis Y, which is normal to and intersects the longitudinal axis of the tube and at a rate $\omega$, the stream will be deflected along path Z from its initial straight line. This deflection is the result of the Coriolis acceleration $A_c$.

If on the other hand the stream 12 were confined within the tube rather than ejected therefrom, so that it could not deflect but was completed to flow through the tube, the pressure developed along one side of the tube and at right angles to the input rate, would increase, whereas the pressure on the opposing side of the tube would correspondingly decrease. This change in pressure ΔP across the tube is a function of the Coriolis acceleration $A_c$, the specific function being:

$$\Delta P = A_c \rho D = 2\rho V_1 \omega D_1$$

where:

$\rho$ = fluid density
$D_1$ = diameter, main tube
$V_1$ = fluid velocity, main tube
$\omega$ = input angular velocity The invention is adapted to sense the value ΔP by providing, as shown in FIGS. 2 and 3, a tube 13 acting as a main flow passage for a fluid under constant pressure and for confining the fluid therein, the tube being mounted for rotation about axis Y at an input rate $\omega$, by means of a spindle 14 attached at right angles to the axis of the tube. A pair of diametrically opposed ports 15 and 16 are formed on either side of the tube at right angles to the input rate axis Y and normal to the tube axis X.

Interconnecting the two ports 15 and 16 and communicating with the main tube, is a flow loop 17. The flow in the loop depends on the pressure difference ΔP between the ports.

The fluid flow in the loop is at a velocity $\vec{v}_2$, such that:

$$V_2 = K\omega$$

$$V_2 = \left(\frac{\rho}{\mu}\right) \frac{D_1 D_2^2 V_1 \omega}{16 L_2}$$

$$\therefore K = \left(\frac{\rho}{\mu}\right) \frac{D_1 D_2^2 V_1}{16 L_2}$$

where:

$\mu$ = kinematic visocosity
$D_2$ = small tube diameter
$L_2$ = developed length of small tube
$K$ = lumped constants for a particular configuration Suspended in the flow loop is a spherical pellet 18 made of a material which is neutrally bouyant within the fluid. The diameter of the pellet substantially corresponds to the internal diameter of the loop, whereby when the port pressures are equal, the fluid velocity $V_2$ is zero, and the pellet is initially placed in a mid or null position in the loop in line with a transverse axis X. With a pressure difference in the loop, the resultant velocity $v_2$ displaces the pellet from its reference point X.

The displacement ΔX of the pellet from its reference under steady state conditions, is equal to K$\theta$, where $\theta$ is the input angular displacement. Thus the fluid integrating gyro makes use of the Coriolis component of acceleration generated by an input $\omega$ to produce an output velocity $v_2$.

The value of displacement ΔX may be detected by optical, electrostatic or electromagnetic techniques. For example, a light-sensitive photovoltaic or photoelectric cell may be mounted above fluid tube 13 in a suitable optical tube 20, the cell being positioned along neutral axis X. A constant beam of light is directed along neutral axis X to be reflected by the pellet, such that maximum reflection and greatest cell output is obtained when the pellet is at its null position, the output decreasing in proportion to displacement ΔX.

Alternatively, a cylindrical permeability slug may be used in place of pellet 18, the loop being surrounded by an inductive pickup coil whereby its inductance is greatest at the null position X and decreases with ΔX.

Neutral buoyancy may be attained by the use of porous or hollow type pellets, the neutrality existing for different fluid densities. By the use of a closed loop for the pick-up path and a neutrally buoyant pellet, the unit may be subjected to appreciable acceleration levels with device effects.

The fluid used in the gyroscope may be selected from a range of properties. It need not be an electrical conductor, for the main flow can be supplied by a pump and accumulator combination rather than by electro-hydrodynamic action. By selecting a temperature-sensitive fluid, the gyro can be made to generate rate temperature signals. Conversely, by selecting a temperature-insensitive fluid such as a silicone oil, the gyro can be made effectively to have a zero temperature coefficient. Thus the gyro can be made to operate accurately through a wide range of temperature variations without recourse to oven regulators.

When used in a servo mode, the gyro produces a pellet movement proportional to the angular shift required by the servo system to reestablish the null position. In this way the gyro may be used to stabilize a platform. The gyro may also be used in a readout mode to provide linear readings of small angles.

Referring to FIG. 4, there is shown a fluid gyro arrangement having three degrees of freedom, namely, roll, pitch and azimuth. For this purpose, three fluid gyros 20, 21 and 22 in accordance with the invention, have their loops mounted in mutually perpendicular positions with respect to common flow tube 23 supplied with fluid at a constant pressure. The flow tube and its associated gyros are mounted on a gimbal system constituted by gimbals 24, 25 and 26.

While there has been shown a preferred embodiment of a gyroscopic device in accordance with the invention, it will be appreciated that many changes and modifications may be made therein without, however, departing from the essential spirit of the invention as defined in the annexed claims.

What is claimed is:

1. A fluid rate integrating gyro comprising a main flow tube having a longitudinal axis, said tube being mounted for rotation about an axis intersecting said longitudinal axis and at right angles thereto, means to flow fluid through said main tube under constant velocity, a loop communicating with said tube on opposing sides thereof, means to displace said tube about said axis of rotation in accordance with an input value whereby the resultant fluid pressure differential in said tube on opposing sides of said longitudinal axis by reason of Coriolis acceleration gives rise to a proportional fluid flow in said loop, and means to detect said loop flow to produce an indication of displacement.

2. A fluid rate integrating gyro comprising a main flow tube having a longitudinal axis, said tube being mounted for rotation about an axis intersecting said longitudinal axis and at right angles thereto, means to flow fluid through said main tube under constant velocity, a loop communicating with said tube on opposing sides thereof, means to displace said tube about said axis of rotation in accordance with an input value whereby the resultant fluid pressure differential in said tube on opposing sides of said longitudinal axis by reason of Coriolis acceleration gives rise to a proportional fluid flow in said loop, a neutrally buoyant pellet suspended in said loop which is displaceable in accordance with fluid flow in said loop, and means to detect the position of said pellet in said loop to produce an indication of displacement.

3. A gyro as set forth in claim 2, wherein said pellet detection means is constituted by an optical detector in which said pellet intercepts a beam of light directed at a photocell.

4. A gyro as set forth in claim 2, wherein said pellet position is detected electrostatically.

5. A gyro as set forth in claim 2, wherein said pellet is formed of permeability material and is detected electromagnetically.

6. A gyro as set forth in claim 2, wherein said fluid is temperature-sensitive whereby said gyro acts to generate rate temperature signals.

7. A gyro as set forth in claim 2, wherein said fluid is silicone oil whereby said gyro has an essentially constant temperature coefficient.

8. A fluid gyro arrangement having three degrees of freedom, comprising three gyros having a common flow tube mounted in a gimbal system having three degrees of freedom, means to circulate a fluid through said flow tube at constant velocity, three loops connected to opposing sides of said flow tube at mutually perpendicular positions and communicating with said tube whereby flow in said loops depends on the differential pressure between opposing sides of said tube, and means coupled to each loop to detect the differential pressure flow therein.

9. An arrangement as set forth in claim 8, wherein said gyros are mounted on a moving body to detect the roll, pitch and yaw thereof.

References Cited by the Examiner
UNITED STATES PATENTS

| | | | |
|---|---|---|---|
| 2,856,142 | 10/1958 | Haviland | 74—5.7 X |
| 2,949,784 | 8/1960 | Maeder | 74—5.7 |

FRED C. MATTERN, JR., *Primary Examiner.*

BROUGHTON G. DURHAM, *Examiner.*

P. W. SULLIVAN, *Assistant Examiner.*